United States Patent
Olivieri et al.

(10) Patent No.: US 9,511,628 B2
(45) Date of Patent: Dec. 6, 2016

(54) LIGHTWEIGHT HUB UNIT WITH INTEGRATED BEARING RINGS AND PROCESS FOR ITS MANUFACTURE

(71) Applicants: Davide Antonio Olivieri, Turin TO (IT); Laura Sguotti, Bosco Marengo (IT)

(72) Inventors: Davide Antonio Olivieri, Turin TO (IT); Laura Sguotti, Bosco Marengo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 165 days.

(21) Appl. No.: 14/154,079

(22) Filed: Jan. 13, 2014

(65) Prior Publication Data

US 2014/0197677 A1    Jul. 17, 2014

(30) Foreign Application Priority Data

Jan. 11, 2013 (IT) .............................. TO2013A0023

(51) Int. Cl.
| | |
|---|---|
| *B60B 27/02* | (2006.01) |
| *B60B 27/00* | (2006.01) |
| *C22C 21/00* | (2006.01) |
| *F16C 35/063* | (2006.01) |
| *B21K 1/40* | (2006.01) |
| *C22F 1/04* | (2006.01) |
| *B60B 27/06* | (2006.01) |
| *F16C 19/18* | (2006.01) |

(52) U.S. Cl.
CPC ............ *B60B 27/0078* (2013.01); *B21K 1/40* (2013.01); *B60B 27/0084* (2013.01); *C22C 21/00* (2013.01); *C22F 1/04* (2013.01); *F16C 35/063* (2013.01); *B60B 27/06* (2013.01); *B60B 2310/208* (2013.01); *B60B 2310/314* (2013.01); *B60B 2310/3142* (2013.01); *B60B 2360/104* (2013.01); *B60B 2380/73* (2013.01); *B60B 2380/82* (2013.01); *B60B 2900/111* (2013.01); *B60B 2900/112* (2013.01); *B60Y 2200/10* (2013.01); *F16C 19/184* (2013.01); *F16C 2326/02* (2013.01); *Y10T 29/49535* (2015.01)

(58) Field of Classification Search
CPC .......................... B60B 27/0005; B60B 27/001
USPC ....................................... 301/109, 110, 5.309
See application file for complete search history.

(56) References Cited

U.S. PATENT DOCUMENTS

| | | | | |
|---|---|---|---|---|
| 4,473,129 | A | * | 9/1984 | Guimbretiere ...... B60B 27/0005 180/254 |
| 5,100,217 | A | * | 3/1992 | Mahnig ............... B60B 27/0005 384/536 |

(Continued)

FOREIGN PATENT DOCUMENTS

| | | |
|---|---|---|
| DE | 102008034593 A1 | 1/2010 |
| WO | 2008147284 A1 | 12/2008 |

(Continued)

*Primary Examiner* — Jeffrey J Restifo
(74) *Attorney, Agent, or Firm* — Bryan Peckjian; SKF USA Inc. Patent Dept.

(57) ABSTRACT

A hub unit is provided with a hub made of an aluminum alloy for plastic processing, which forms, in a single piece, an axially extending cylindrical portion and a radial flange; two bearing rings are mounted axially aligned around the cylindrical portion, an axially inner edge of the cylindrical portion is plastically deformed in a radially outer direction against the axially inner bearing ring.

11 Claims, 1 Drawing Sheet

(56) References Cited

U.S. PATENT DOCUMENTS

| | | | | |
|---|---|---|---|---|
| 5,725,285 A * | 3/1998 | Niebling | B60B 27/0005 | 301/105.1 |
| 5,764,049 A * | 6/1998 | Hofmann | B60B 27/0005 | 324/173 |
| 5,782,566 A * | 7/1998 | Bertetti | B60B 27/0005 | 384/537 |
| 5,983,482 A * | 11/1999 | Kawatani | B23P 13/02 | 279/137 |
| 5,984,422 A * | 11/1999 | Seifert | B60B 27/001 | 192/69.1 |
| 6,037,766 A * | 3/2000 | Goossens | B60B 27/0005 | 324/173 |
| 6,099,167 A * | 8/2000 | Goto | B60B 27/0005 | 301/105.1 |
| 6,112,411 A * | 9/2000 | Rutter | B60B 27/00 | 29/525 |
| 6,161,963 A * | 12/2000 | Doell | B60B 27/00 | 384/541 |
| 6,170,919 B1 * | 1/2001 | Hofmann | B60B 27/0005 | 301/105.1 |
| 6,443,622 B1 * | 9/2002 | Webb | B23P 11/00 | 384/448 |
| 6,464,399 B1 * | 10/2002 | Novak, Jr. | B60B 27/00 | 301/105.1 |
| 8,302,309 B2 * | 11/2012 | Hirai | B21K 1/40 | 188/18 A |
| 2006/0215948 A1 * | 9/2006 | Bosco | B60B 27/00 | 384/544 |
| 2006/0257063 A1 * | 11/2006 | Shigeoka | B60B 27/0005 | 384/544 |
| 2007/0135220 A1 * | 6/2007 | Welschof | B60B 27/00 | 464/140 |
| 2007/0201783 A1 * | 8/2007 | Hirai | B60B 27/0005 | 384/544 |
| 2007/0217728 A1 * | 9/2007 | Kashiwagi | B60B 27/001 | 384/544 |
| 2007/0230850 A1 * | 10/2007 | Seo | B60B 27/0005 | 384/544 |
| 2007/0230853 A1 * | 10/2007 | Inoue | B60B 27/001 | 384/589 |
| 2008/0093914 A1 * | 4/2008 | Mabuchi | B60B 3/04 | 301/105.1 |
| 2008/0144985 A1 * | 6/2008 | Joki | B60B 3/04 | 384/448 |
| 2008/0205810 A1 * | 8/2008 | Maeda | B60B 27/001 | 384/544 |
| 2008/0238184 A1 * | 10/2008 | Cermak | B60B 27/00 | 301/110 |
| 2009/0034894 A1 * | 2/2009 | Furukawa | B60B 27/001 | 384/487 |
| 2009/0189436 A1 * | 7/2009 | Hirai | B60B 27/0005 | 301/110 |
| 2009/0208159 A1 * | 8/2009 | Heim | B60B 27/001 | 384/448 |
| 2010/0002972 A1 * | 1/2010 | Ohtsuki | B60B 27/0005 | 384/544 |
| 2010/0021099 A1 * | 1/2010 | Torii | B60B 27/0005 | 384/544 |
| 2010/0054646 A1 * | 3/2010 | Dlugai | B60B 27/0005 | 384/512 |
| 2010/0109424 A1 * | 5/2010 | Inoue | B60B 27/00 | 301/109 |
| 2010/0239202 A1 * | 9/2010 | Kuroda | B21H 1/12 | 384/512 |
| 2010/0301666 A1 * | 12/2010 | Shibata | B60B 27/0005 | 301/109 |
| 2010/0320832 A1 * | 12/2010 | Weigand | B60B 27/001 | 301/110 |
| 2011/0012420 A1 * | 1/2011 | Nakagawa | B60B 27/0005 | 301/110 |
| 2011/0069922 A1 * | 3/2011 | Ravenna | B60B 27/0005 | 384/589 |
| 2011/0129176 A1 * | 6/2011 | Koma | B60B 27/001 | 384/484 |
| 2011/0235957 A1 * | 9/2011 | Vissers | B22D 17/007 | 384/523 |
| 2011/0248555 A1 * | 10/2011 | Werries | B60B 27/0005 | 301/109 |
| 2011/0304197 A1 * | 12/2011 | Norimatsu | B60B 27/00 | 301/110 |
| 2012/0076450 A1 * | 3/2012 | Suma | B60B 27/00 | 384/452 |
| 2013/0127235 A1 * | 5/2013 | Yamamoto | B60B 27/0005 | 301/109 |
| 2013/0147257 A1 * | 6/2013 | van de Sanden | B21D 39/06 | 301/109 |
| 2013/0257005 A1 * | 10/2013 | Schumacher | B60B 27/001 | 280/124.125 |
| 2013/0334870 A1 * | 12/2013 | Ozawa | B60B 27/00 | 301/109 |
| 2013/0342004 A1 * | 12/2013 | Yamauchi | B60B 27/00 | 301/109 |
| 2014/0175862 A1 * | 6/2014 | Anno | B60B 27/0047 | 301/109 |
| 2014/0183932 A1 * | 7/2014 | Song | B60B 27/0015 | 301/110 |
| 2014/0197677 A1 * | 7/2014 | Olivieri | C22C 21/00 | 301/110 |
| 2014/0197678 A1 * | 7/2014 | Olivieri | B60B 27/0078 | 301/110 |
| 2014/0232176 A1 * | 8/2014 | Ravenna | B60B 27/0005 | 301/110 |
| 2015/0054334 A1 * | 2/2015 | Song | F16C 43/04 | 301/110 |
| 2015/0273939 A1 * | 10/2015 | Mochinaga | F16C 19/18 | 301/6.1 |

FOREIGN PATENT DOCUMENTS

| | | |
|---|---|---|
| WO | 2009008152 A1 | 1/2009 |
| WO | 2010063299 A1 | 6/2010 |

* cited by examiner

LIGHTWEIGHT HUB UNIT WITH INTEGRATED BEARING RINGS AND PROCESS FOR ITS MANUFACTURE

CROSS-REFERENCE TO RELATED APPLICATION

This application is a United States Non-Provisional Utility Patent Application claiming the benefit of Italia Patent Application Number TO2013A000023 filed on 11 Jan. 2013, which is incorporated herein in its entirety. It is noted that 11 Jan. 2013 falls on a Saturday; therefore Applicant is afforded until the next business day to maintain co-pendency.

TECHNICAL FIELD

The present invention relates to a lightweight hub unit with integrated bearing rings, for a hub bearing assembly on a motor vehicle wheel. The invention also relates to a method for manufacturing such units.

BACKGROUND ART

For the assembly of a motor vehicle wheel, usually hub bearing assemblies with a double-row of rolling-contact elements interposed between the respective inner and outer raceways are used. The two radially outer raceways are both formed by the same outer bearing ring. The two radially inner raceways are formed by two respective annular steel bodies, integral in rotation to a steel hub that forms a cylindrical portion extending in an axially inner direction, and a flange that extends in a radially outer direction allowing to assemble the wheel. In the hub-bearing units of the so-called third generation, the steel hub directly forms the inner raceway for the row from the outboard side. The inner raceway for the row of rolling-contact elements from the inboard side, however, is made by a steel ring formed separately by the hub, also known as small inner ring, and fitted on the cylindrical portion of the hub. In the hub-bearing units of the so-called second generation, the inner raceways are formed by two respective steel rings (small inner rings) fitted axially aligned on the cylindrical portion of the hub. The cylindrical portion of the hub has a tubular end that protrudes over a radial surface at the axially inner end of the inner ring located on the axially inner side. This tubular end undergoes a cold deformation, typically by orbital roll forming, in a radially outer direction; a rolled, plastically deformed edge is thus obtained, which axially locks the second ring and axially preloads the entire bearing unit. The machines performing the orbital roll forming must be able to apply a very high force to the forming tool, generally greater than 100,000 N.

Therefore, an object of the invention is to reduce the force required to perform the orbital roll forming, possibly using less efficient machines but facing lower costs.

It is known that the raceways must be hard enough to withstand the Hertzian stresses of the rolling contact. For this reason, in a third generation hub bearing assembly it is necessary for the hub to undergo induction hardening treatment in order to harden only the raceway area. The hardened area must not extend as far as the end portion to be rolled, since this must not become too hard and brittle, but must instead remain suitable for undergoing plastic processing. Another object of the invention is therefore, to eliminate the costs associated with the need to carry out traditional thermal hardening treatment by induction.

A further object of the invention is to reduce the overall weight of a hub bearing unit. In the automotive industry there is an ever increasing demand in terms of reduction of the weight of motor vehicle component parts in order to reduce fuel consumption and exhaust emissions. In order to reduce the overall weight of the wheel and, in particular of the rotating mass, in recent years hub bearing assemblies have been proposed having a rotating flanged ring made of two different materials, joined together in a single piece. In such rings, a tubular core made of a first material of high toughness, such as steel for bearings, forms the raceways, and a second light material, such as a light metal, forms the remaining part of the ring, including an outer flange for mounting the wheel. See for example the patent publication WO 2008/147284 A1. In some cases, the coupling between the steel core and the lighter flange is made by form coupling with interference. These couplings do not always prove to be long-lasting, especially after prolonged use. Indeed, the different coefficients of thermal expansion of steel and aluminum tend to cause the two materials to separate one from the other. In other cases, the coupling is obtained by molding or casting the light material, for example an aluminum alloy, over the tubular steel core. To avoid or limit movements between the two materials, in rings of this type, the two materials are joined with complexly-shaped interface surfaces, so as to produce undercuts that behave as joints between the two materials. The costs of producing rings using this technology are rather high.

SUMMARY OF THE PRESENT INVENTION

For the achievement of the purposes set out above, the invention proposes to build a hub unit having the features set out in claim 1. According to another aspect, the invention proposes a manufacturing method as defined in claim 4. According to a further aspect, the invention provides a hub bearing assembly for a motor vehicle wheel comprising the hub unit as defined above by claim 1 or by the claims depending on it, or, according to another aspect, a hub unit manufactured according to the method of claim 4 or secondary claims depending on it. Preferred embodiments of the invention are defined in the dependent claims.

BRIEF DESCRIPTION OF DRAWINGS

Certain preferred embodiments of the invention are described below with reference to the accompanying drawings, in which.

DETAILED DESCRIPTION OF THE PRESENT INVENTION

Figure 1:
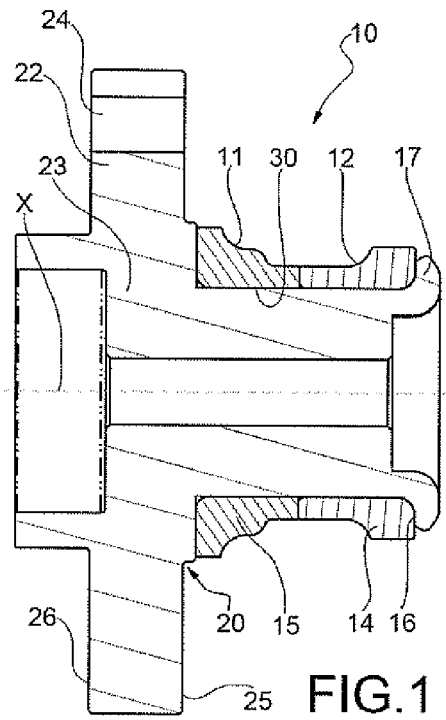
FIG. 1 is a view in axial section of a hub unit with bearing rings integrated according to a typical embodiment of this invention.
Figure 2:
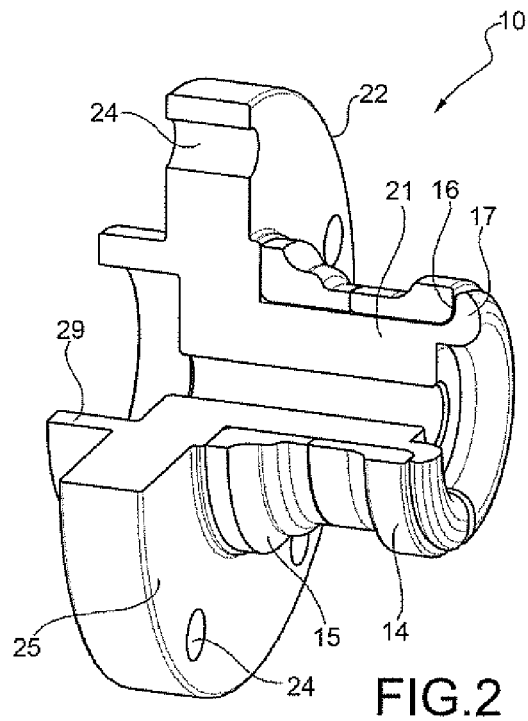
FIG. 2 is a partially sectioned perspective view of the unit of FIG. 1.

Referring initially to FIGS. 1 and 2, the number 10 indicates as a whole a lightweight hub unit with integrated bearing rings, for a hub bearing assembly of a motor vehicle wheel. The unit 10 defines a central rotation axis x and is designed to rotatably mount a wheel (not shown) of a motor vehicle around the x axis. The hub bearing assembly is not shown here in its entirety. As is known, a hub bearing assembly also includes a stationary outer ring, which is connected in use to an upright of the vehicle suspension (not shown). The hub bearing assembly, of which the hub unit 10 is intended to be part, is a hub bearing assembly of the type having a double-row of rolling-contact elements interposed between the respective inner and outer raceways. For this purpose, the hub unit 10 has two radially inner raceways, indicated by 11, 12, axially spaced one away from the other.

Throughout this description and in the claims, the terms and expressions indicating positions and directions such as for example "radial", "axial", "transverse", are to be understood as referring to the x rotation axis. Expressions such as "axially inner" (or "inboard") and "axially outer" (or "outboard"), on the other hand, refer to the condition mounted on the vehicle.

The unit 10 comprises an inner hub 20 made of an aluminum alloy for plastic processing, preferably an aluminum alloy of the assembly (series) 6000 for the reasons described later:

The hub 20 forms, in a single piece (FIG. 3), a cylindrical portion 21 which extends in an axial direction, and a flange 22 which extends in a radially outer direction from the axially outer end 23 of the cylindrical portion 21.

The flange 22 serves to mount a wheel (not shown) of the vehicle. Four/five axial holes 24 can be formed in the flange in angularly equidistant positions around the x axis. The holes 24 are suitable to accommodate a corresponding plurality of fixing elements (not shown), for example screws for fixing the wheel. The flange has an axially inner radial surface 25, designed to be directed toward the vehicle while in use, and an axially outer radial face 26, forming a flat support surface for a brake rotor (not shown) and/or for the wheel of the vehicle.

The cylindrical portion 21 serves to support two radially inner bearing rings 14, 15, axially side by side or adjacent to one another. In the embodiment illustrated here, the cylindrical portion 21 has a tubular shape, and includes, in this example, an axially extending inner cylindrical cavity 27. In this particular illustrated embodiment, the inner cavity 27 passes through the whole body. In other embodiments, depending on the type of wheel to be fitted (e.g. driving or driven), the cavity 27 can be closed. In still other embodiments, the cylindrical portion 21 may be filled internally, i.e. without a cavity 27.

An axially tubular inner end of the cylindrical portion 21 is indicated by 28. The cylindrical portion 21 has a radially outer cylindrical surface 30. The hub 20 can also form an axial tubular tailpiece 29 protruding from the axially outer side, to facilitate the centering of the wheel.

Figure 3:
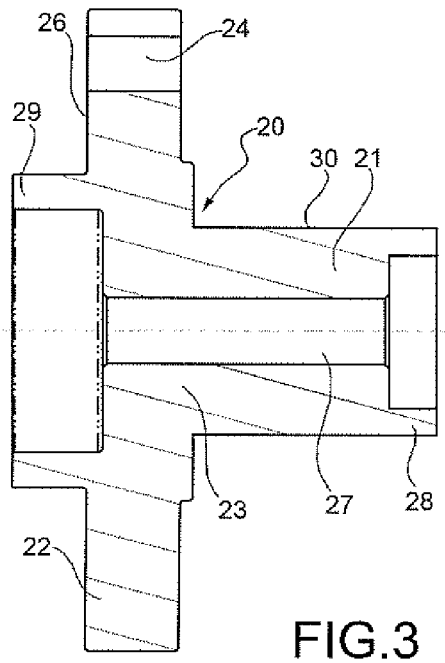
FIG. 3 is a view in axial section of the hub unit of FIG. 2 during an intermediate phase of the manufacturing process.

The hub 20 as shown schematically in FIG. 3 is obtained by a forging process, either hot or cold, followed by a possible further machining. Once the desired shape is obtained, the hub can undergo a thermal cycle, preferably a T6 thermal cycle, to improve the mechanical properties of the material in aluminum alloy.

Figure 4:
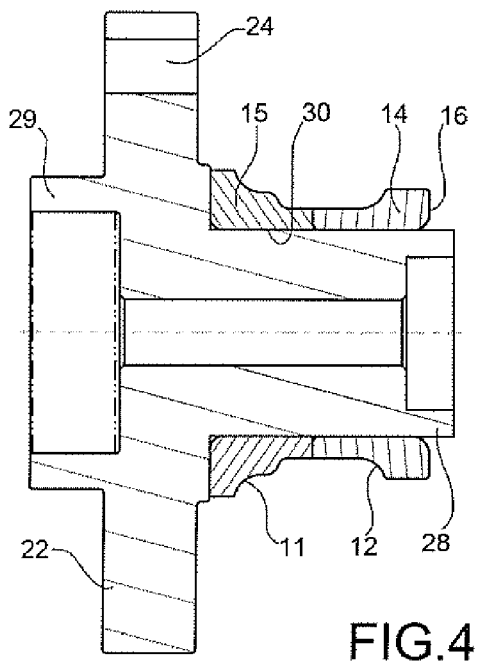
FIG. 4 is a view in axial section of the hub unit of FIG. 2 in a phase of the manufacturing process subsequent to that of FIG. 3.

Numerals 14 and 15 indicate in FIG. 4 the first and the second bearing ring which respectively have the corresponding radially inner raceways 12, 13 for two rows of rolling-contact elements (for example balls or tapered rollers, not shown). Bearing rings 14, 15 are then placed on the outer cylindrical surface 30 of the cylindrical portion of the hub, bringing the first axially outer inner ring 15 in abutment against the axially inner surface or side 25 of the flange 22. Preferably, in order to further enhance the circumferential locking of the bearing rings 14 and 15 on the hub, the bearing rings are mounted with radial interference on the outer cylindrical surface 30 of the cylindrical portion 21 of the hub. In this condition (FIG. 4), the axially inner tubular end 28 protrudes axially, at least partially, over a radial surface or end face 16 presented by the second ring being axially innermost 14 facing in an axially inner direction.

The tubular end 28 of the hub then undergoes a cold deformation by orbital roll forming, in a radially outer direction, thus obtaining a rolled, plastically deformed edge 17, which axially locks both bearing rings 14 and 15 in an axially preloaded condition on the hub 20 (FIGS. 1 and 2).

Those skilled in the art will recognise that the roll forming operation is actually carried out after a series of steps that are here omitted and not shown since they are unnecessary for understanding the invention. It will suffice to mention here that prior to the orbital roll forming, it is necessary to preliminarily position a row of rolling-contact elements on the axially outer side or outboard side, around the first inner ring 14, then apply a radially outer bearing ring, then insert a row of rolling-contact elements from the axially inner side or inboard side. Thereafter it is possible to apply the second inner ring 15 and to finally perform the orbital roll forming.

Due to the rolled edge 17, the bearing rings 14, 15 remain firmly locked on the hub 20 both axially and circumferentially and rotationally.

The choice to build the hub 20 in an aluminum alloy for plastic processing causes the outer surface of the rolled edge 17 not to become porous, and therefore the rolled edge 15 not to be subject to corrosion, particularly to so-called crack corrosion.

The alloys of the group 6000 are alloys of aluminum, silicon and magnesium, also known under the trade name Anticorodal, which have an excellent workability with the machine tools and can undergo a thermal hardening treatment (T6 treatment or by precipitation), keeping however a residual extension or ductility capacity not lower than 11-12% after the treatment. This feature advantageously allows to obtain a durable rolled edge. Examples of particularly preferred alloys include the following alloys: 6061; 6082.

It can be considered that the roll forming of an edge in aluminum alloy requires a much lower force than that required for roll forming a traditional steel edge. The axial force applied during the roll forming phase can be calibrated in such a way as to take into account the fact that, due to the greater thermal expansion of the aluminum alloy compared to steel, the preload in axial direction exerted by the edge 17 against the inner rings 14, 15 is reduced at operating temperatures.

The hub made of aluminum alloy has advantages in terms of weight, emissions and energy consumption. Complex shape combinations as for hub composites made of aluminum with a tubular steel insert are not required.

It is understood that the invention is not limited to the embodiments described and illustrated here, which are to be considered as examples of the unit; those skilled in the art will understand that it is possible to make various changes as regards shape, sizes, constructive and functional details and configuration of the elements described in the exemplary embodiment, without going beyond the scope of the invention as defined in the appended claims and their equivalents.

What is claimed is:

1. A hub unit with integrated bearing rings, the hub unit comprising:
    a single-piece hub including:

a cylindrical portion extending in an axial direction, a flange extending radially outwardly from an axially outer end of the cylindrical portion, and a first and a second bearing ring axially aligned and mounted around the cylindrical portion, wherein the second bearing ring is axially inner with respect to the first bearing ring and provides an end face facing an axially inner direction;

the cylindrical portion forming an axially inner end edge plastically deformed in a radially outer direction against the end face of the second bearing ring;

wherein the hub is made of a wrought aluminum alloy, and wherein the first bearing ring and the second bearing ring are configured to be slidably mounted on the cylindrical portion.

2. The hub unit according to claim 1, wherein the aluminum alloy is an alloy of the 6000 series.

3. The hub unit according to claim 2, wherein the aluminum alloy is an alloy selected from a group consisting of the following alloys: 6061; 6082.

4. A hub bearing unit for a motor vehicle wheel, the hub bearing unit comprising:

a hub unit according to claim 1, wherein the hub bearing unit is configured for use with a motor vehicle wheel.

5. The hub unit according to claim 1, wherein the first bearing ring has a minimum inner diameter and the second bearing ring has a minimum inner diameter the same as the minimum inner diameter of the first bearing ring.

6. A method of manufacturing a hub unit with integrated bearing rings, the method comprising:

providing a single-piece hub made of a wrought aluminum alloy including a cylindrical portion extending in an axial direction and a flange extending radially outwardly from an axially outer end of the cylindrical portion, mounting a first bearing ring and a second bearing ring in axial alignment around the cylindrical portion, wherein the second bearing ring is axially inner with respect to the first bearing ring and provides an end face facing an axially inner direction; and plastically deforming an axially inner edge of the cylindrical portion in a radially outer direction against the end face of the second bearing ring, wherein mounting a first bearing ring and a second bearing ring in axial alignment around the cylindrical portion comprises sliding the first bearing ring axially onto the cylindrical portion and sliding the second bearing ring axially onto the cylindrical portion.

7. The method according to claim 6, wherein the aluminum alloy is an alloy of the 6000 series.

8. The method according to claim 7, wherein the aluminum alloy is an alloy selected from a group consisting of the following alloys: 6061; 6082.

9. The method according to claim 7 including subjecting the hub to a hardening treatment.

10. The method according to claim 9, wherein the hardening includes a T6 heat treatment.

11. The method according to claim 7 wherein plastically deforming the axially inner edge of the cylindrical portion comprises plastically deforming the axially inner edge such that the axially inner edge axially preloads the first and second bearing rings toward the flange.

* * * * *